United States Patent
Oh et al.

(10) Patent No.: US 11,942,640 B2
(45) Date of Patent: Mar. 26, 2024

(54) NEGATIVE ELECTRODE ACTIVE MATERIAL FOR LITHIUM SECONDARY BATTERY AND LITHIUM SECONDARY BATTERY COMPRISING THE SAME

(71) Applicant: LG ENERGY SOLUTION, LTD., Seoul (KR)

(72) Inventors: Il-Geun Oh, Daejeon (KR); Dong-Hyuk Kim, Daejeon (KR); Yong-Ju Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 487 days.

(21) Appl. No.: 17/420,592

(22) PCT Filed: Jan. 20, 2020

(86) PCT No.: PCT/KR2020/000961
§ 371 (c)(1),
(2) Date: Jul. 2, 2021

(87) PCT Pub. No.: WO2020/149724
PCT Pub. Date: Jul. 23, 2020

(65) Prior Publication Data
US 2022/0077467 A1    Mar. 10, 2022

(30) Foreign Application Priority Data

Jan. 18, 2019 (KR) .................. 10-2019-0007121

(51) Int. Cl.
| | | |
|---|---|---|
| H01M 4/58 | (2010.01) | |
| H01M 4/04 | (2006.01) | |
| H01M 4/36 | (2006.01) | |
| H01M 10/0525 | (2010.01) | |
| H01M 4/02 | (2006.01) | |

(52) U.S. Cl.
CPC ....... *H01M 4/5825* (2013.01); *H01M 4/0471* (2013.01); *H01M 4/364* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 2014/0178754 A1 | 6/2014 | Kim et al. |
| 2015/0325839 A1 | 11/2015 | Put et al. |
| 2016/0028085 A1 | 1/2016 | Kim et al. |
| 2016/0372753 A1 | 12/2016 | Fukusawa et al. |
| 2018/0090750 A1* | 3/2018 | Oh ........................ H01M 4/483 |
| 2018/0269475 A1 | 9/2018 | Oh et al. |
| 2019/0123344 A1 | 4/2019 | Hirose et al. |

FOREIGN PATENT DOCUMENTS

| | | |
|---|---|---|
| JP | 2010-170943 A | 8/2010 |
| JP | 5369708 B2 | 12/2013 |
| JP | 2017-224600 A | 12/2017 |
| JP | 6306767 B1 | 4/2018 |
| KR | 10-2014-0081679 A | 7/2014 |
| KR | 10-2015-0050504 A | 5/2015 |
| KR | 10-2015-0096781 A | 8/2015 |
| KR | 10-1586816 B1 | 1/2016 |
| KR | 10-2018-0106485 A | 10/2018 |
| WO | 2017091543 A1 | 6/2017 |
| WO | 2017/208627 A1 | 12/2017 |
| WO | 10-2018-0087340 A | 8/2018 |

OTHER PUBLICATIONS

International Search Report issued in corresponding International Patent Application No. PCT/KR2020/000961, dated May 7, 2020.
Extended European Search Report dated Feb. 10, 2022 issued in corresponding European Patent Application No. 20740917.8.
Malvern Instruments Worldwide, "A Basic Guide to Particle Characterization," White Paper, pp. 1-26 (2012).
Office Action issued in corresponding European Patent Application No. 20740917.8 dated Jul. 1, 2022.

\* cited by examiner

*Primary Examiner* — Wyatt P McConnell
(74) *Attorney, Agent, or Firm* — Bryan Cave Leighton Paisner LLP

(57) ABSTRACT

Provided is a negative electrode active material for a lithium secondary battery which includes: a silicon-silicon oxide-magnesium silicate composite comprising a silicon oxide ($SiO_x$, $0<x\leq2$) matrix; and silicon (Si) crystal grains, $MgSiO_3$ crystal grains and $Mg_2SiO_4$ crystal grains present in the silicon oxide matrix, wherein the $MgSiO_3$ crystal grains have a crystal size of 5-30 nm and the $Mg_2SiO_4$ crystal grains have a crystal size of 20-100 nm in the silicon-silicon oxide-magnesium silicate composite, and the content ratio of $MgSiO_3$ crystal grains to $Mg_2SiO_4$ crystal grains is 2:1-1:1 on the weight basis. A method for preparing the negative electrode active material for a lithium secondary battery is also provided.

10 Claims, No Drawings

NEGATIVE ELECTRODE ACTIVE MATERIAL FOR LITHIUM SECONDARY BATTERY AND LITHIUM SECONDARY BATTERY COMPRISING THE SAME

TECHNICAL FIELD

The present application claims priority to Korean Patent Application No. 10-2019-0007121 filed on Jan. 18, 2019 in the Republic of Korea. The present disclosure relates to a negative electrode active material for a lithium secondary battery and a lithium secondary battery including the same.

BACKGROUND ART

As negative electrode materials for non-aqueous electrolyte batteries, carbonaceous materials obtained by firing graphite or organic materials have high charge/discharge efficiency and excellent cycle life characteristics, and thus have been commercialized widely. However, as portable electronic communication devices or power tools have been downsized, weight-lightened and provided with high quality and a need for high capacity for commercialization of electric vehicles has been increased, there has been a need for a negative electrode material substituting for such carbonaceous materials having low battery capacity due to structural characteristics.

Recently, active studies about metals, such as Si and Sn, have been conducted despite several problems of metallic negative electrodes. Particularly, since a silicon-based negative electrode has a theoretical capacity of 4200 mAh/g corresponding to about 10 times or more of the theoretical capacity 370 mAh/g of a carbonaceous negative electrode, studies about silicon-based negative electrodes have been conducted intensively.

Silicon as a negative electrode material undergoes volumetric swelling to 300% or more through the reaction with lithium during charge and then is shrunk during discharge. Due to such a rapid swelling and shrinking phenomenon, the negative electrode material particles cause cracking or separation of the electrode undesirably, resulting in a serious problem of rapid degradation of cycle life.

A silicon oxide-based negative electrode suggested to solve the above-mentioned problem provides a low capacity as compared to silicon, but shows higher capacity as compared to the capacity of a carbonaceous negative electrode and a lower volumetric swelling ratio as compared to metals, and thus has been spotlighted as an advanced material having excellent cycle life characteristics. When using such silicon oxide as a negative electrode material for a secondary battery, it is possible to obtain a capacity approximately 5 times higher than the capacity of a carbonaceous negative electrode active material but corresponding to approximately a half of the capacity of a silicon negative electrode active material. However, when using silicon oxide as a negative electrode material for a secondary battery, there still is a problem in that it shows a larger change in volume during charge/discharge as compared to a carbonaceous negative electrode material.

In addition, when using silicon oxide as a negative electrode material for a secondary battery, silicon oxide undergoes reaction with lithium upon the initial charge to produce lithium silicide and lithium oxide (lithium oxide and lithium silicate). Particularly, lithium oxide cannot participate in the subsequent electrochemical reaction and a part of lithium transported to a negative electrode upon the initial charge cannot be returned to a positive electrode, and thus irreversible reaction occurs, resulting in depletion of lithium undesirably.

In the case of silicon oxide, it shows high irreversible capacity as compared to the other silicon-based negative electrodes and provides a significantly low initial charge efficiency (ICE, ratio of initial discharge capacity to charge capacity) of 70-75%. Such low initial efficiency requires excessive capacity of a positive electrode, when manufacturing a secondary battery, thereby causing a setoff of the capacity per unit weight of a negative electrode.

To solve the above-mentioned problems, magnesium-doped silicon-silicon oxide composites have been prepared in the art. However, there still has been a need for improvement in terms of cycle characteristics.

DISCLOSURE

Technical Problem

The present disclosure is designed to solve the problems of the related art, and therefore the present disclosure is directed to providing a negative electrode active material capable of improving the initial efficiency, capacity and cycle characteristics of a lithium secondary battery. The negative electrode active material for a lithium secondary battery includes a silicon-silicon oxide-magnesium silicate ($Si$—$SiO_x$—Mg silicate) composite, wherein two types of magnesium silicates comprised in the composite have a predetermined composition and content.

The present disclosure is also directed to providing a method for manufacturing the negative electrode active material for a lithium secondary battery.

Technical Solution

According to the first embodiment of the present disclosure, there is provided a negative electrode active material for a lithium secondary battery which includes a silicon-silicon oxide-magnesium silicate composite comprising a silicon oxide ($SiO_x$, $0<x\leq2$) matrix; and silicon (Si) crystal grains, $MgSiO_3$ crystal grains and $Mg_2SiO_4$ crystal grains present in the silicon oxide matrix, wherein the content ratio of $MgSiO_3$ crystal grains to $Mg_2SiO_4$ crystal grains is 2:1-1:1 on the weight basis.

According to the second embodiment of the present disclosure, there is provided the negative electrode active material for a lithium secondary battery as defined in the first embodiment, wherein the content ratio of $MgSiO_3$ crystal grains to $Mg_2SiO_4$ crystal grains is 1.5:1-1:1 on the weight basis.

According to the third embodiment of the present disclosure, there is provided the negative electrode active material for a lithium secondary battery as defined in the first or the second embodiment, wherein the $MgSiO_3$ crystal grains in the silicon-silicon oxide-magnesium silicate composite have a crystal size of 5-30 nm.

According to the fourth embodiment of the present disclosure, there is provided the negative electrode active material for a lithium secondary battery as defined in any one of the first to the third embodiments, wherein the $Mg_2SiO_4$ crystal grains in the silicon-silicon oxide-magnesium silicate composite have a crystal size of 20-50 nm.

According to the fifth embodiment of the present disclosure, there is provided the negative electrode active material for a lithium secondary battery as defined in any one of the first to the fourth embodiments, wherein the $Mg_2SiO_4$ crystal grains have a crystal size corresponding to 1-2 times of the crystal size of the $MgSiO_3$ crystal grains.

According to the sixth embodiment of the present disclosure, there is provided the negative electrode active material for a lithium secondary battery as defined in any one of the first to the fifth embodiments, wherein the total content of Mg metal is 4-20 wt % based on the weight of the silicon-silicon oxide-magnesium silicate composite particles.

According to the seventh embodiment of the present disclosure, there is provided the negative electrode active material for a lithium secondary battery as defined in any one of the first to the sixth embodiments, wherein the content ratio of $MgSiO_3$ crystal grains to $Mg_2SiO_4$ crystal grains is 1.5:1-1:1 on the weight basis.

According to the eighth embodiment of the present disclosure, there is provided a negative electrode for a lithium secondary battery including the negative electrode active material for a lithium secondary battery as defined in any one of the first to the seventh embodiments.

According to the ninth embodiment of the present disclosure, there is provided a lithium secondary battery including the negative electrode for a lithium secondary battery as defined in the eighth embodiment.

According to the tenth embodiment of the present disclosure, there is provided a method for preparing the silicon-silicon oxide-magnesium silicate composite as defined in the first embodiment, including the steps of: (S1) introducing a mixture comprising silicon powder, silicon dioxide ($SiO_2$) powder and Mg powder at a molar ratio of silicon powder to silicon dioxide ($SiO_2$) powder of 1:0.5-1:1.5 and a molar ratio of silicon powder to Mg powder of 1:0.01-1:1 to a reactor; (S2) heating the mixture comprising silicon powder, silicon dioxide ($SiO_2$) powder and Mg powder to 1,000-1,800° C. under vacuum so that silicon oxide vapor resulting from a mixed powder of silicon powder and silicon dioxide ($SiO_2$) powder and magnesium vapor may be generated at the same time to carry out vapor-phase reaction, and then cooling the reaction mixture to precipitate a silicon-silicon oxide-magnesium silicate composite at 650-900° C.; and (S3) pulverizing the precipitated silicon-silicon oxide-magnesium silicate composite to an average particle diameter of 0.1-20 μm.

Advantageous Effects

The non-aqueous secondary battery including a Si—$SiO_x$—Mg silicate composite as a negative electrode active material according to the present disclosure can satisfy high battery capacity, excellent cycle characteristics and high charge/discharge efficiency at the same time.

The effects of the present disclosure are not limited to the above-mentioned effect and it should be understood that the effects of the present disclosure include any effects inferable from the constitution of the present disclosure as described in the following detailed description and claims.

BEST MODE

Hereinafter, preferred embodiments of the present disclosure will be described in detail.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

It will be further understood that the terms "comprises" and/or "comprising", or "includes" and/or "including" when used in this specification, specify the presence of stated features, numbers, steps, elements or combinations thereof, but do not preclude the presence or addition of one or more other features, numbers, steps, elements or combinations thereof.

As used herein. '$D_{50}$ average particle diameter' means a value measured as weight average $D_{50}$ (particle diameter when accumulated weight reaches 50% of the total weight, or median diameter) in particle size distribution analysis through laser light diffraction.

In one aspect of the present disclosure, there is provided a negative electrode active material for a lithium secondary battery which includes a silicon-silicon oxide-magnesium silicate composite comprising a silicon oxide ($SiO_x$, 0<x≤2) matrix; and silicon (Si) crystal grains, $MgSiO_3$ crystal grains and $Mg_2SiO_4$ crystal grains present in the silicon oxide matrix, wherein the content ratio of $MgSiO_3$ crystal grains to $Mg_2SiO_4$ crystal grains is 2:1-1:1 on the weight basis.

As used herein, 'crystal size' is determined by analyzing the ratio of diffraction peak intensities through X-ray diffractometry, and the particular analysis method is referred to the following Test Example 1.

Preferably, the silicon crystal grains, $MgSiO_3$ crystal grains and $Mg_2SiO_4$ crystal grains are distributed homogeneously in the silicon-silicon oxide-magnesium silicate composite. More preferably, the silicon crystal grains, $MgSiO_3$ crystal grains and $Mg_2SiO_4$ crystal grains are dispersed and distributed homogeneously in the silicon oxide matrix and embedded/buried therein.

According to an embodiment of the present disclosure, in the $MgSiO_3$ crystal grains and $Mg_2SiO_4$ crystal grains, elements in each phase are interfused so that the boundary surfaces of each phase may be bound with one another. In other words, each phase is bound at an atomic level. As a result, even when lithium ions are intercalated/deintercalated, a change in volume of the silicon-silicon oxide-magnesium silicate is small, and particle cracking hardly occurs even after repeating charge/discharge.

According to an embodiment of the present disclosure, the $MgSiO_3$ crystal grains have a crystal size of 5-30 nm, 5-25 nm, 8-17 nm, or 11-17 nm. When the $MgSiO_3$ crystal grains have the above-defined range of crystal size, it is possible to obtain an effect of increasing initial efficiency and improving life characteristics. The crystal size may be determined according to the Sherrer equation (see, the following Mathematical Formula 1) based on the full width at half maximum (FWHM) of the diffraction peak of $MgSiO_3$ (310) in X-ray diffractometry, and is based on a silicon-silicon oxide-magnesium silicate composite obtained at a precipitation temperature of 25° C. during the preparation process. X-ray diffractometry may be carried out according to the conventional XRD method. According to an embodiment of the present disclosure, XRD may be carried out in a 2θ range of 10-90° by using CuKα rays (e.g. wavelength of light source: 1.5406 Å). Herein, scanning speed may be selected suitably.

$$C.S. \text{ [nm]} = K \cdot \lambda / B \cdot \cos \theta \quad \text{[Mathematical Formula 1]}$$

wherein K=0.9, λ=0.154 nm, B=full width at half maximum (FWHM, rad), and θ=peak position (angle).

According to an embodiment of the present disclosure, the $Mg_2SiO_4$ crystal grains have a crystal size of 20-100 nm, 22-50 nm, 22-40 nm, or 22-33 nm. When the $Mg_2SiO_4$ crystal grains have the above-defined range of $D_{50}$ average particle diameter, it is possible to obtain an effect of increasing initial efficiency and improving life characteristics. The crystal size may be determined according to the Sherrer equation (see, the following Mathematical Formula 1) based on the full width at half maximum (FWHM) of the diffraction peak of the $Mg_2SiO_4$ (130) in X-ray diffractometry, and is based on a silicon-silicon oxide-magnesium silicate composite obtained at a precipitation temperature of 25° C. during the preparation process.

$$C.S. \text{ [nm]} = K \cdot \lambda / B \cdot \cos \theta \quad \text{[Mathematical Formula 1]}$$

wherein K=0.9, λ=0.154 nm, B=full width at half maximum (FWHM, rad), and θ=peak position (angle).

According to an embodiment of the present disclosure, each of the $MgSiO_3$ crystal grains and $Mg_2SiO_4$ crystal grains has the above-defined range of $D_{50}$ average particle diameter, while the $Mg_2SiO_4$ crystal grains have a crystal size corresponding to 1 time or more, or 1-2 times of the crystal size of the $MgSiO_3$ crystal grains. Even though each of the $MgSiO_3$ crystal grains and $Mg_2SiO_4$ crystal grains has the above-defined range of crystal size, it is possible to obtain an effect of improving electrical conductivity and an effect of improving life characteristics through the improvement of physical strength only when the $Mg_2SiO_4$ crystal grains have a $D_{50}$ average particle diameter corresponding to 1 time or more of the crystal size of the $MgSiO_3$ crystal grains.

According to the present disclosure, the $MgSiO_3$ crystal grains and $Mg_2SiO_4$ crystal grains are distributed in the silicon oxide matrix. As used herein, the term 'silicon oxide' refers to general compounds represented by the formula of $SiO_x$ (0<x≤2). According to an embodiment of the present disclosure, the silicon oxide matrix includes silicon oxide $SiO_x$ (0<x≤2), and is an ingredient inactive to Li so that Li intercalation/deintercalation may not occur during the charge of a battery.

According to the present disclosure, in addition to the $MgSiO_3$ crystal grains and $Mg_2SiO_4$ crystal grains, Si crystal grains are dispersed and distributed in the silicon oxide matrix. The Si crystal grains preferably have a crystal size of 1-15 nm, 5-12 nm, or 10-12 nm. When the Si crystal size is larger than the above-defined range, life characteristics may be degraded. The Si crystal grain size may be determined according to the Sherrer equation (see, the following Mathematical Formula 1) based on the full width at half maximum (FWHM) of the diffraction peak of Si (111) in X-ray diffractometry, and is based on a silicon-silicon oxide-magnesium silicate composite obtained at a precipitation temperature of 25° C. during the preparation process.

$$C.S. \text{ [nm]} = K \cdot \lambda / B \cdot \cos \theta \quad \text{[Mathematical Formula 1]}$$

wherein K=0.9, λ=0.154 nm, B=full width at half maximum (FWHM, rad), and θ=peak position (angle).

According to an embodiment of the present disclosure, total content of Mg metal is 4-20 wt %, 6-16 wt %, or 8-12 wt %, based on the weight of the silicon-silicon oxide-magnesium silicate composite. When the content of Mg metal satisfies the above-defined range, it is possible to provide an effect of improving the efficiency of a lithium secondary battery using the silicon-silicon oxide-magnesium silicate composite as a negative electrode active material, while minimizing a decrease in capacity of the battery.

According to an embodiment of the present disclosure, the content ratio of the $MgSiO_3$ crystal grains to $Mg_2SiO_4$ crystal grains in the silicon-silicon oxide-magnesium silicate composite particles may be 2:1-1:1, 1.5:1-1:1, or 1.4:1-1:1, on the weight basis. When the ratio of the $MgSiO_3$ crystal grains to $Mg_2SiO_4$ crystal grains satisfies the above-defined range, it is possible to provide an effect of increasing initial efficiency and improving life characteristics.

According to an embodiment of the present disclosure, the silicon-silicon oxide-magnesium silicate composite particles may have an average particle diameter ($D_{50}$) of 0.1-20 μm, or 0.5-15 μm. When the silicon-silicon oxide-magnesium silicate composite has the above-defined range of average particle diameter, it may be distributed homogeneously in slurry for forming a negative electrode during the preparation of the slurry, only a suitable amount of binder is required, and the problem of swelling of silicon crystal grains during charge/discharge and separation of the silicon-silicon oxide-magnesium silicate composite particles from the current collector may be minimized.

According to an embodiment of the present disclosure, the silicon-silicon oxide-magnesium silicate composite particles may have a BET specific surface area of 1-50 $m^2/g$ as determined by nitrogen adsorption. When the silicon-silicon oxide-magnesium silicate composite particles have the above-defined range of BET specific surface area, it is possible to form a negative electrode having a uniform coating layer of slurry for forming a negative electrode and to minimize side reactions in a lithium secondary battery during the charge/discharge.

According to an embodiment of the present disclosure, the silicon-silicon oxide-magnesium silicate composite particles may further include a coating layer or deposition layer comprising a carbonaceous material on the surfaces thereof. When using a silicon-based material as a negative electrode active material for a lithium secondary battery, electrical resistance may be increased. Thus, it is possible to improve conductivity by coating the surfaces of the particles comprising a silicon-based material with a carbonaceous material.

There is no particular limitation in the carbonaceous material. For example, the carbonaceous material may include graphite, such as natural graphite, artificial graphite or expandable graphite, carbon black, such as acetylene black or Ketjen black, and carbon fibers. In addition, hydrocarbon materials, such as methane, ethane, propane, butane, acetylene, carbon monoxide, benzene, toluene or xylene, may be used. Preferably, the particle surfaces may include a coating layer or deposition layer including a carbonaceous material with a view to improvement of conductivity of the silicon-silicon oxide-magnesium silicate composite particles.

According to an embodiment of the present disclosure, the carbonaceous material may be used in an amount of 1-20 parts by weight, or 1-10 parts by weight, based on 100 parts by weight of the silicon-silicon oxide-magnesium silicate composite particles. When the carbonaceous material is used in the above-defined range, it is possible to prevent the problem of an undesired increase in specific surface area of an electrode, while improving conductivity of the electrode and charge/discharge characteristics and cycle characteristics of a battery.

In another aspect of the present disclosure, there is provided a method for preparing the silicon-silicon oxide-magnesium silicate composite particles to be used as a negative electrode active material for a lithium secondary battery. An embodiment of the method includes the steps of: (S1) introducing a mixture comprising silicon powder, silicon dioxide ($SiO_2$) powder and Mg powder at a molar ratio of silicon powder to silicon dioxide ($SiO_2$) powder of 1:0.5-1:1.5 and a molar ratio of silicon powder to Mg powder of 1:0.01-1:1 to a reactor; (S2) heating the mixture comprising silicon powder, silicon dioxide ($SiO_2$) powder and Mg powder to 1,000-1,800° C. under vacuum so that silicon oxide vapor resulting from a mixed powder of silicon powder and silicon dioxide ($SiO_2$) powder and magnesium vapor may be generated at the same time to carry out vapor-phase reaction, and then cooling the reaction mixture to precipitate a silicon-silicon oxide-magnesium silicate composite at 650-900° C.; and (S3) pulverizing the precipitated silicon-silicon oxide-magnesium silicate composite to an average particle diameter of 0.1-20 μm.

When the heating temperature of the mixture comprising mixed powder of silicon with silicon dioxide ($SiO_2$) and Mg is lower than 1,000° C., it is difficult to improve initial efficiency through heat treatment. When the heating temperature is higher than 1,800° C., silicon crystals are grown excessively to cause cracking in the silicon oxide composite structure due to volumetric swelling and shrinking of the silicon crystals according to lithium ion intercalation, resulting in degradation of cycle characteristics.

Each of the gaseous silicon oxide ($SiO_x$) and gaseous Mg may be formed by a heating process under a reduced pressure atmosphere of −50 to −200 torr.

The temperature, where the silicon-silicon oxide-magnesium silicate composite is precipitated by cooling the mixture comprising a mixed powder of silicon with silicon dioxide ($SiO_2$) and Mg after it is heated, may be 650-900° C. According to an embodiment of the present disclosure, the temperature where the silicon-silicon oxide-magnesium silicate composite is precipitated may be controlled to 650-900° C. When the cooling and precipitation temperature of the silicon-silicon oxide-magnesium silicate composite is lower than 650° C., the silicon oxide and Mg may be cooled rapidly after it undergoes vapor-phase reaction to produce nanopowder and to cause a rapid increase in specific surface area of the silicon-silicon oxide-magnesium silicate composite, resulting in degradation of battery characteristics. When the cooling and precipitation temperature of the silicon-silicon oxide-magnesium silicate composite is higher than 900° C., silicon crystal size may be increased to several tens of nanometers or more, resulting in rapid degradation of the life characteristics of a battery.

There is no particular limitation in the method for forming a coating layer or deposition layer comprising a carbonaceous material on the surface of the silicon-silicon oxide-magnesium silicate composite. For example, an organic polymer coating film may be formed on the surface of the silicon-silicon oxide-magnesium silicate composite and then pyrolyzed under inert atmosphere. Otherwise, a coating layer or deposition layer comprising a carbonaceous material may be formed by heat treating hydrocarbon or organic gas through a chemical vapor deposition process. According to a preferred embodiment of the present disclosure, any additional heat treatment is not carried out after forming the coating layer or deposition layer.

When using the chemical deposition process, in the case of at a temperature of 600-1200° C., a carbonaceous material may be produced at an adequate rate, while decomposition of raw material gases does not occur overly rapidly.

The carbonaceous raw material gas may include a hydrocarbon-based material, such as benzene, toluene, xylene, methane, ethane, ethylene, propane, butane, acetylene or carbon monoxide. In addition, more inexpensive gas, such as liquefied petroleum gas (LPG) or liquefied natural gas (LNG), may be used.

The carbonaceous material formed on the surfaces of the silicon-silicon oxide-magnesium silicate composite particles may include any one selected from crystalline carbon, amorphous carbon, carbon fibers, carbon whiskers, carbon nanofibers, carbon nanotubes, graphene, oxidized graphene and reduced graphene, or a mixture thereof.

In still another aspect of the present disclosure, there is provided a lithium secondary battery which includes a negative electrode including the silicon-silicon oxide-magnesium silicate composite particles as a negative electrode active material, a positive electrode, a separator interposed between the positive electrode and the negative electrode, and an electrolyte.

The positive electrode may include a positive electrode current collector and a mixture of a positive electrode active material, a conductive material and a binder, disposed on the positive electrode current collector.

The positive electrode current collector should have high conductivity, allow easy adhesion of the above-mentioned mixture, and show no reactivity in the voltage range of the corresponding battery. Particular examples of the positive electrode current collector include aluminum, nickel, alloys thereof, or the like. The positive electrode current collector may have a thickness of 3-500 μm.

Particular examples of the positive electrode active material include: lithium cobalt oxides such as $Li_xCoO_2$ (0.5<x<1.3); lithium nickel oxides such as $Li_xNiO_2$ (0.5<x<1.3); lithium manganese oxides such as $Li_{1+x}Mn_{2-x}O_4$ (wherein x is 0-0.33), $LiMnO_3$, $LiMn_2O_3$, $LiMn_2O_4$ or $Li_xMnO_2$ (0.5<x<1.3); lithium copper oxides such as $Li_2CuO_2$; lithium iron oxides such as $LiFe_3O_4$; lithium nickel cobalt manganese oxides such as $Li[Ni_xCo_yMn_z]O_2$ (x+y+z=1, 0<x<1, 0<y<1, 0<z<1); lithium nickel cobalt aluminum oxides such as $Li[Ni_xCo_yAl_z]O_2$ (x+y+z=1, 0<x<1, 0<y<1, 0<z<1); lithium vanadium compounds such as $LiV_3O_8$; Ni-site type lithium nickel oxides represented by the chemical formula of $LiNi_{1+x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides in which Li is partially substituted with an alkaline earth metal ion; disulfide compounds; vanadium oxides such as $V_2O_5$ or $Cu_2V_2O_7$; $Fe_2(MoO_4)_3$; or the like. More particularly, the positive electrode active material may include lithium nickel cobalt manganese oxides such as $Li[Ni_xCo_yMn_z]O_2$ (x+y+z=1, and each of x, y and z independently represents a number of 0.3-0.4) or lithium nickel cobalt aluminum oxides such as $Li[Ni_xCo_yAl_z]O_2$ (x+y+z=1, and each of x, y and z independently represents a number of 0.3-0.4). Such positive electrode active materials may be used alone or in combination.

The conductive material is a material having conductivity while not causing any chemical change in the lithium secondary battery according to the present disclosure. Particular examples of the conductive material include: graphite, such as natural graphite or artificial graphite; carbon black, such as carbon black, acetylene black, Ketjen black, channel black, furnace black, lamp black or thermal black; conductive fibers, such as carbon fibers or metallic fibers; carbon fluoride; metal powder, such as aluminum or nickel powder; conductive whisker, such as zinc oxide or potassium titanate; conductive metal oxide, such as titanium oxide; conductive materials, such as polyphenylene derivatives; or the like.

The binder is an ingredient which assists binding between the positive electrode active material and the conductive material and binding to the current collector. Particular examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer (EPDM) rubber, hydrogenated nitrile butadiene rubber (HNBR), sulfonated ethylene propylene diene, styrene butadiene rubber (SBR), fluororubber, various copolymers, or the like.

The negative electrode includes a negative electrode current collector and a negative electrode active material disposed on the negative electrode current collector.

The negative electrode current collector should have high conductivity, allow easy adhesion of the negative electrode active material, and show no reactivity in the voltage range of the corresponding battery. Particular examples of the negative electrode current collector include copper, gold, nickel, alloys thereof, or the like.

Description of the negative electrode active material is the same as the above description of the embodiments of the negative electrode active material.

The separator prevents a short-circuit between the positive electrode and the negative electrode and provides a lithium ion transport channel. The separator may include an insulation thin film having high ion permeability and mechanical strength. Particular examples of the separator include polyolefin-based polymer membranes, such as polypropylene and polyethylene, or multilayer films, microporous films, woven fabrics or non-woven fabrics thereof, or the like. When a solid electrolyte, such as the polymer described hereinafter, is used, it may also be used as a separator.

The electrolyte may be a lithium salt-comprising electrolyte. Particular examples of the anion of the lithium salt include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like. Such anions may be incorporated into the electrolyte alone or in combination.

The lithium secondary battery according to an embodiment of the present disclosure may be provided in the form a cylindrical battery using a can, a prismatic battery, pouch-type battery or a coin-type battery, but its outer shape is not limited thereto.

The lithium secondary battery according to an embodiment of the present disclosure may be applied not only to a battery cell used as a power source for compact type devices but also as a unit cell in a medium- or large-scale battery module including a plurality of battery cells. Particular examples of the medium- or large-scale devices include electric vehicles, hybrid electric vehicles, plug-in hybrid electric vehicles or power storage system, but are not limited thereto.

Examples will be described more fully hereinafter so that the present disclosure can be understood with ease.

Example 1

A mixture comprising silicon powder, silicon dioxide ($SiO_2$) powder and Mg powder at a molar ratio of silicon powder to silicon dioxide ($SiO_2$) powder of 1:1 and a molar ratio of silicon powder to Mg powder of 1:0.5 was introduced to a reactor. The mixture comprising silicon powder, silicon dioxide ($SiO_2$) powder and Mg powder was heated to 1,500° C. under a reduced pressure atmosphere of −100 torr and under vacuum to carry out vapor-phase reaction by generating silicon oxide vapor resulting from a mixed powder of silicon powder with silicon dioxide ($SiO_2$) powder and magnesium vapor at the same time, and then cooled to precipitate a silicon-silicon oxide-magnesium silicate composite at 800° C. Then, the silicon-silicon oxide-magnesium silicate composite was pulverized with a jet mill to an average particle diameter ($D_{50}$) of 5 μm, thereby recovering powder of silicon-silicon oxide-magnesium silicate composite particles. Herein, the content of Mg was 10.2% based on the weight of the silicon-silicon oxide-magnesium silicate composite particles.

The recovered silicon-silicon oxide-magnesium silicate composite particles were subjected to chemical vapor deposition (CVD) by using a tube-shaped electric furnace at 1,000° C. for 2 hours in the presence of a mixed gas of argon (Ar) with methane ($CH_4$) to obtain silicon-silicon oxide-magnesium silicate composite particles having a carbon coating layer with a carbon content of 5 wt %. The resultant silicon-silicon oxide-magnesium silicate composite particles having a carbon coating layer was not subjected to further heat treatment.

After the powder of silicon-silicon oxide-magnesium silicate composite particles (Sample 1) was analyzed with inductively coupled plasma-atomic emission spectroscopy (ICP-AES), it was shown that magnesium concentration was 10.2 wt %. After carrying out X-ray diffractometry (CuKα), it was shown that Si crystal grains had a size of 10.8 nm.

The resultant silicon-silicon oxide-magnesium silicate composite includes a silicon oxide ($SiO_x$, 0<x≤2) matrix; and silicon (Si) crystal grains, $MgSiO_3$ crystal grains and $Mg_2SiO_4$ crystal grains present in the silicon oxide matrix. Each of the crystal size of $MgSiO_3$ crystal grains and that of $Mg_2SiO_4$ crystal grains in the silicon-silicon oxide-magnesium silicate composite, and the ratio of crystal size of $Mg_2SiO_4$ crystal grains to crystal size of $MgSiO_3$ crystal grains are shown in the following Table 1.

Example 2

Powder of silicon-silicon oxide-magnesium silicate composite particles were obtained in the same manner as Example 1, except that the mixed powder was heat treated at a temperature of 1,400° C.

Comparative Example 1

Powder of silicon-silicon oxide-magnesium silicate composite particles were obtained in the same manner as Example 1, except that the cooling temperature after carrying out vapor-phase reaction by generating silicon oxide vapor and magnesium vapor at the same time was set to 600° C.

Comparative Example 2

A mixture comprising silicon powder, silicon dioxide ($SiO_2$) powder and Mg powder at a molar ratio of silicon powder to silicon dioxide ($SiO_2$) powder of 1:1 and a molar ratio of silicon powder to Mg powder of 1:0.5 was introduced to a reactor. The mixture comprising silicon powder, silicon dioxide ($SiO_2$) powder and Mg powder was heated to 1,500° C. under a reduced pressure atmosphere of −100 torr and under vacuum to carry out vapor-phase reaction by generating silicon oxide vapor resulting from a mixed powder of silicon powder with silicon dioxide ($SiO_2$) powder and magnesium vapor at the same time, and then cooled to precipitate a silicon-silicon oxide-magnesium silicate composite at 400° C.

The recovered silicon-silicon oxide-magnesium silicate composite particles were subjected to chemical vapor deposition (CVD) by using a tube-shaped electric furnace at 1,000° C. for 2 hours in the presence of a mixed gas of argon (Ar) with methane ($CH_4$) to obtain silicon-silicon oxide-magnesium silicate composite particles having a carbon coating layer with a carbon content of 5 wt %.

Then, the powder of silicon-silicon oxide-magnesium silicate composite particles having a carbon coating layer was further heat treated at 1,000° C. for 5 hours under argon (Ar) atmosphere to obtain powder of silicon-silicon oxide-magnesium silicate composite particles as a final product.

Comparative Example 3

Powder of silicon-silicon oxide-magnesium silicate composite particles were obtained in the same manner as Comparative Example 1, except that additional heat treatment was further carried out at 1,200° C. for 5 hours under argon (Ar) atmosphere in the final step.

<Manufacture Example: Manufacture of Coin Cell>

Each of the samples obtained from Examples 1 and 2 and Comparative Examples 1-3 was used as a negative electrode active material, and mixed with Super-P black as a conductive material and polyacrylic acid (PAA) as a binder at a weight ratio of 80:10:10 to obtain a slurry-like composition.

The composition was applied to one surface of copper foil having a thickness of 18 μm, followed by drying, to form an active material layer having a thickness of 30 μm on one surface of copper foil, and then punched into a circular shape having a diameter of 14Φ to obtain a test electrode. Lithium foil having a thickness of 0.3 mm was used as a counter electrode.

A porous polyethylene sheet having a thickness of 0.1 mm was used as a separator. As an electrolyte, $LiPF_6$ as a lithium salt dissolved in a mixed solvent of ethylene carbonate (EC) with diethyl carbonate (DEC) (volume ratio 1:1) to a concentration of about 1 mol/L was used. The above-mentioned elements were received in a casing made of stainless steel to obtain a coin cell with a conventional shape for evaluation having a thickness of 2 mm and a diameter of 32 mm (so called a 2032 type coin cell).

Test Example 1: Analysis of Diffraction Peak Intensity Ratio Through X-Ray Diffractometry Each of the samples obtained from Examples 1 and 2 and Comparative Examples 1-3 was analyzed by X-ray diffractometry. The results are shown in the following Table 1.

The size of $MgSiO_3$ crystal grains may be determined according to the Sherrer equation (see, the following Mathematical Formula 1) based on the full width at half maximum (FWHM) of the diffraction peak of the $MgSiO_3$ (310) in X-ray diffractometry, and is based on a silicon-silicon oxide-magnesium silicate composite obtained at a precipitation temperature of 25° C. during the preparation process.

$$C.S. \text{ [nm]} = K \cdot \lambda / B \cdot \cos \theta \quad \text{[Mathematical Formula 1]}$$

wherein K=0.9, λ=0.154 nm, B=full width at half maximum (FWHM, rad), and θ=peak position (angle).

In addition, the size of $Mg_2SiO_4$ crystal grains may be determined according to the Sherrer equation (see, the following Mathematical Formula 1) based on the full width at half maximum (FWHM) of the diffraction peak of the $Mg_2SiO_4$ (130) in X-ray diffractometry, and is based on a silicon-silicon oxide-magnesium silicate composite obtained at a precipitation temperature of 25° C. during the preparation process.

$$C.S. \text{ [nm]} = K \cdot \lambda / B \cdot \cos \theta \quad \text{[Mathematical Formula 1]}$$

wherein K=0.9, λ=0.154 nm, B=full width at half maximum (FWHM, rad), and θ=peak position (angle).

The size of Si crystal grains may be determined according to the Sherrer equation (see, the following Mathematical Formula 1) based on the full width at half maximum (FWHM) of the diffraction peak of Si (111) in X-ray diffractometry, and is based on a silicon-silicon oxide-magnesium silicate composite obtained at a precipitation temperature of 25° C. during the preparation process.

$$C.S. \text{ [nm]} = K \cdot \lambda / B \cdot \cos \theta \quad \text{[Mathematical Formula 1]}$$

wherein K=0.9, λ=0.154 nm, B=full width at half maximum (FWHM, rad), and θ=peak position (angle).

The content of each of Mg, $MgSiO_3$ and $Mg_2SiO_4$ was determined through inductively coupled plasma (ICP).

TABLE 1

| | Mg content (wt %) | Si crystal grain size | Crystal size of $MgSiO_3$ crystal grains (nm) | Crystal size of $Mg_2SiO_4$ crystal grains (nm) | Ratio of crystal size of $Mg_2SiO_4$ crystal grains/ crystal size of $MgSiO_3$ crystal grains | Content of $MgSiO_3$ crystal grains (wt %) | Content of $Mg_2SiO_4$ crystal grains (wt %) | Ratio of $MgSiO_3$ crystal grains/ Content of $Mg_2SiO_4$ crystal grains (weight basis) |
|---|---|---|---|---|---|---|---|---|
| Ex. 1 | 10.2 | 10.8 | 16.2 | 32.4 | 2 | 24.7 | 17.3 | 1.4 |
| Ex. 2 | 10.6 | 11.2 | 11.2 | 22.4 | 2 | 24.3 | 17.5 | 1.4 |
| Comp. Ex. 1 | 10.5 | 10.7 | No $MgSiO_3$ crystal grains | 32.1 | Not available | Not available | 18.0 | Not available |

TABLE 1-continued

| | Mg content (wt %) | Si crystal grain size | Crystal size of MgSiO$_3$ crystal grains (nm) | Crystal size of Mg$_2$SiO$_4$ crystal grains (nm) | Ratio of crystal size of Mg$_2$SiO$_4$ crystal grains/crystal size of MgSiO$_3$ crystal grains | Content of MgSiO$_3$ crystal grains (wt %) | Content of Mg$_2$SiO$_4$ crystal grains (wt %) | Ratio of MgSiO$_3$ crystal grains/Content of Mg$_2$SiO$_4$ crystal grains (weight basis) |
|---|---|---|---|---|---|---|---|---|
| Comp. Ex. 2 | 10.1 | 10.3 | 5.4 | 10.9 | 2 | 14.8 | 24.3 | 0.6 |
| Comp. Ex. 3 | 10.4 | 10.1 | 21.1 | 23.4 | 1.1 | 17.8 | 22.2 | 0.8 |

Test Example 2: Evaluation of Battery Characteristics

The coin cell obtained by using each of the powder of silicon-silicon oxide-magnesium silicate composite particles obtained from Examples 1 and 2 and Comparative Examples 1-3 was charged to a voltage of 0.01V at a constant current of 0.05 C and discharged to a voltage of 1.5V at a constant current of 0.05 C to evaluate discharge capacity and initial efficiency.

In addition, the coin cell obtained according to the above Manufacture Example by using each sample was charged to a voltage of 0.01V at a constant current of 0.2 C and discharged to a voltage of 1.5V at a constant current of 0.2 C to evaluate cycle characteristics for 50 cycles after the first charge/discharge.

The discharge capacity, initial efficiency and cycle characteristics were obtained as follows. The results are shown in the following Table 2.

Initial discharge capacity: Discharge Capacity at the first cycle

Initial efficiency: 100×(Discharge capacity at the first cycle)/(Charge capacity at the first cycle)

TABLE 2

| | Initial efficiency (%) | Capacity mAh/g | Life characteristics (%, 50$^{th}$ cycle) |
|---|---|---|---|
| Ex. 1 | 90.8 | 405.2 | 82 |
| Ex. 2 | 90.6 | 404.8 | 80 |
| Comp. Ex. 1 | 88.1 | 401.9 | 77 |
| Comp. Ex. 2 | 85.1 | 392.7 | 62 |
| Comp. Ex. 3 | 87.2 | 398.4 | 70 |

As shown in Table 2, the case of the coin cell batteries using the silicon-silicon oxide-magnesium silicate composite particles according to Examples 1 and 2 of the present disclosure as negative electrode active materials provide improved initial charge/discharge efficiency and excellent capacity and cycle characteristics, as compared to the coin cell batteries using the silicon-silicon oxide-magnesium silicate composite particles according to Comparative Examples 1-3.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description. For example, each of constitutional elements described in a singular form may be realized in division and constitutional elements described in division may be realized in a combined form.

It should be understood that the scope of the present disclosure is defined by the following claims and covers any changes and modifications derived from the technical gist and category of the claims and equivalents thereof.

What is claimed is:

1. A negative electrode active material for a lithium secondary battery comprising:
a silicon-silicon oxide-magnesium silicate composite comprising:
a silicon oxide (SiO$_x$, 0<x≤2) matrix; and
silicon (Si) crystal grains, MgSiO$_3$ crystal grains and Mg$_2$SiO$_4$ crystal grains present in a silicon oxide matrix;
wherein the MgSiO$_3$ crystal grains have a crystal size of 5-30 nm and the Mg$_2$SiO$_4$ crystal grains have a crystal size of 20-100 nm in the silicon-silicon oxide-magnesium silicate composite, and
a weight content ratio of MgSiO$_3$ crystal grains to Mg$_2$SiO$_4$ crystal grains is 2:1-1:1.

2. The negative electrode active material for a lithium secondary battery according to claim 1, wherein the silicon crystal grains, the MgSiO$_3$ crystal grains and the Mg$_2$SiO$_4$ crystal grains are embedded in the silicon oxide matrix.

3. The negative electrode active material for a lithium secondary battery according to claim 1, wherein the MgSiO$_3$ crystal grains have the crystal size of 5-25 nm.

4. The negative electrode active material for a lithium secondary battery according to claim 1, wherein the Mg$_2$SiO$_4$ crystal grains have the crystal size of 20-50 nm.

5. The negative electrode active material for a lithium secondary battery according to claim 1, wherein the Mg$_2$SiO$_4$ crystal grains have a crystal size corresponding to 1-2 times of the crystal size of the MgSiO$_3$ crystal grains.

6. The negative electrode active material for a lithium secondary battery according to claim 1, wherein a total content of Mg metal in the negative electrode active material is 4-20 wt % based on a total weight of silicon-silicon oxide-magnesium silicate composite particles.

7. The negative electrode active material for a lithium secondary battery according to claim 1, wherein the weight content ratio of MgSiO$_3$ crystal grains to Mg$_2$SiO$_4$ crystal grains is 1.4:1-1.

8. A negative electrode for a lithium secondary battery comprising the negative electrode active material for a lithium secondary battery according to claim 1.

9. A lithium secondary battery comprising the negative electrode for a lithium secondary battery according to claim 8.

10. A method for preparing the silicon-silicon oxide-magnesium silicate composite according to claim 1, comprising:
   introducing a mixture comprising silicon powder, silicon dioxide ($SiO_2$) powder and Mg powder at a molar ratio of the silicon powder to the silicon dioxide ($SiO_2$) powder of 1:0.5-1:1.5 and a molar ratio of the silicon powder to the Mg powder of 1:0.01-1:1 to a reactor;
   heating the mixture comprising the silicon powder, the silicon dioxide ($SiO_2$) powder and the Mg powder to 1,000-1,800° C. under vacuum so that silicon oxide vapor resulting from a mixed powder of the silicon powder and the silicon dioxide ($SiO_2$) powder and magnesium vapor may be generated at the same time to carry out a vapor-phase reaction, and then cooling the reaction mixture to precipitate a silicon-silicon oxide-magnesium silicate composite at 650-900° C.; and
   pulverizing the precipitated silicon-silicon oxide-magnesium silicate composite to an average particle diameter of 0.1-20 μm.

* * * * *